United States Patent
Arora et al.

(10) Patent No.: US 12,511,577 B2
(45) Date of Patent: *Dec. 30, 2025

(54) DETERMINING AVAILABILITY OF NETWORK SERVICE

(71) Applicant: Hughes Network Systems, LLC, Germantown, MD (US)

(72) Inventors: Amit Arora, Germantown, MD (US); John Kenyon, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/865,492

(22) Filed: Jul. 15, 2022

(65) Prior Publication Data

US 2023/0004867 A1  Jan. 5, 2023

Related U.S. Application Data

(63) Continuation of application No. 16/236,739, filed on Dec. 31, 2018, now Pat. No. 11,423,328.

(51) Int. Cl.
 *G06N 20/00* (2019.01)
 *G06N 5/02* (2023.01)
(52) U.S. Cl.
 CPC ............ *G06N 20/00* (2019.01); *G06N 5/02* (2013.01)
(58) Field of Classification Search
 CPC .... H04W 48/18–20; G06N 5/00; G06N 20/00
 (Continued)

(56) References Cited

U.S. PATENT DOCUMENTS

| 7,831,679 B2 | 11/2010 | Apacible et al. |
| 9,107,147 B1 | 8/2015 | Meng et al. |

(Continued)

FOREIGN PATENT DOCUMENTS

WO   WO 2012100144   7/2012

OTHER PUBLICATIONS

Price, Thomas and Lerba, Eytan, "Machine Learning to Select Best Network Access Point", Technical Disclosure Commons, (Dec. 12, 2017) <www.tdcommons.org/dpubs_series/936> (Year: 2017).*

(Continued)

*Primary Examiner* — James D. Rutten
(74) *Attorney, Agent, or Firm* — Kilpatrick Townsend & Stockton LLP (57) ABSTRACT

Methods, systems, and apparatus, including computer programs encoded on a computer storage medium, for determining availability of network service. In some implementations, a request indicating a location and a communication service level is received. A first subset of service providers or communication technologies is determined based on outputs generated by multiple first machine learning models each trained to predict service availability for different service providers or communication technologies. A second subset is selected from the first subset based on outputs generated by multiple second machine learning models trained to predict availability of different communication service levels for different service providers or communication technologies. At least one service provider or communication technology is selected from the second subset based on output generated by a third machine learning model. A response to the request indicating the selected service provider or communication technology is provided.

20 Claims, 4 Drawing Sheets

(58) Field of Classification Search
USPC ............................................... 706/12, 14, 45
See application file for complete search history.

(56) References Cited

U.S. PATENT DOCUMENTS

| | | | |
|---|---|---|---|
| 9,159,034 | B2 | 10/2015 | Pinckney et al. |
| 9,509,524 | B2 | 11/2016 | Lewis |
| 9,654,361 | B2 | 5/2017 | Vasseur et al. |
| 9,684,706 | B2 | 6/2017 | Satzke et al. |
| 10,051,533 | B2 | 8/2018 | Fitzpatrick |
| 10,163,114 | B2 | 12/2018 | Lidstrom et al. |
| 10,318,534 | B2 | 6/2019 | Pinckney et al. |
| 10,402,760 | B2 | 9/2019 | Kinsey, II |
| 10,778,702 | B1* | 9/2020 | Huang ................ H04L 63/1425 |
| 2008/0270225 | A1 | 10/2008 | Beygelzimer et al. |
| 2014/0122594 | A1 | 5/2014 | Uzunalioglu et al. |
| 2014/0187242 | A1 | 7/2014 | Zhang |
| 2015/0131483 | A1 | 5/2015 | Colban et al. |
| 2018/0167861 | A1 | 6/2018 | Kavoussi et al. |
| 2018/0331908 | A1 | 11/2018 | Gal et al. |
| 2019/0036716 | A1* | 1/2019 | Kasaragod ............ H04L 63/104 |
| 2019/0114481 | A1* | 4/2019 | DeChant ............. G06V 10/764 |
| 2019/0246324 | A1* | 8/2019 | Cizdziel ................ H04W 16/14 |
| 2020/0007430 | A1* | 1/2020 | Klemetti ............. H04L 41/5019 |
| 2020/0029240 | A1* | 1/2020 | Li ........................... H04L 43/08 |
| 2020/0042701 | A1* | 2/2020 | Yang ...................... G06N 3/045 |
| 2020/0136975 | A1 | 4/2020 | Arora et al. |
| 2020/0210809 | A1* | 7/2020 | Kaizerman ......... G07F 17/3241 |

OTHER PUBLICATIONS

Fuez et al., "Ranking and automatic selection of machine learning models," Dec. 13, 2017, Technical Disclosure Commons, Dec. 13, 2017, 34 pages.

International Preliminary Report on Patentability in International Appln. No. PCT/US2019/066832, dated Jul. 15, 2021, 7 pages.

International Search Report and Written Opinion in International Appln. No. PCT/US2019/066832, dated Apr. 2, 2020, 11 pages.

Haddar et al., "Supervised machine learning for service providers' classification using multiple criteria in a network architecture environment," Presented at the Proceedings of the 12th International Conference on Intelligent Systems: Theories and Applications, Rabat, Rabat-Salé-Kénitra, Morocco, Oct. 24-25, 2018, 7 pages.

Summons to Attend Oral Proceedings Pursuant to Rule 115(1) EPC in European Appln. No. 19842454.1, Mar. 11, 2024, 10 pages.

Wasim et al., "Cloud Service Providers Optimized Ranking Algorithm Based on Machine Learning and Multi-Criteria Decision Analysis," Preprints, Jan. 2018, 11 pages.

* cited by examiner

DETERMINING AVAILABILITY OF NETWORK SERVICE

CROSS-REFERENCE TO RELATED APPLICATIONS

This application is a continuation of U.S. application Ser. No. 16/236,739, filed Dec. 31, 2018, which is incorporated by reference.

BACKGROUND

Determining what types of network connectivity are available for a location can involve a number of factors. Many different types of communications services exist, and connectivity may potentially be provided over different types of physical channels, such as coaxial cable, fiber optics, phone lines, satellite networks, or cellular networks. However, not all types of connectivity are available at all locations. In addition, even when one type of communication service is available, the upload and download speeds available may vary from one location to another. Often, different locations may have significantly different connectivity options, e.g., using different physical connections and/or service levels as well as through different service providers. As a result, determining which connectivity options would meet the needs at a location can require coordinating communication among many different systems or organizations, which can result in significant delays in selecting and establishing appropriate network service.

SUMMARY

In some implementations, a system can train and use several types of machine learning models to predict which communication technologies and service providers are appropriate for different locations. In general, the process of identifying and establishing network connectivity (e.g., using technologies such as cable, fiber optics, digital subscriber line (DSL), satellite, cellular, etc.) can be performed more efficiently with different sets of classification models, each trained to provide a different type of classification decision. This provides a powerful approach to select service providers and network technologies for specific locations without relying on service providers to indicate whether service is available. The results from this approach can be provided to remote devices through an application programming interface (API), so that users can obtain estimates of service availability, service quality levels, and other information through a web page, application, or another interface.

Models can be trained using pre-qualification results collected over time for different service providers and network technologies and for different locations. Typically, obtaining pre-qualification data for a specific location involves a request to the service provider and delay while waiting for a response to be received. These delays can be significant, sometimes, hours, days, or a week or more. Further, pre-qualification data is typically desired from multiple service providers, which can extend the delay to receive results. To reduce dependence on the responses of service providers and to avoid these delays, pre-qualification data that is incrementally received for various locations can be stored in a database and used as a training data set to train machine learning models to predict pre-qualification results. For example, by training models based on prequalification results received over the last year, the models can quickly and effectively predict which service providers and communication technologies are available at different locations, and what service levels are available (e.g., different uplink and downlink speeds) without the need to solicit pre-qualification data from service providers.

One or more machine learning models can also be used to select a service provider and communication technology from the options that are predicted to be available. As noted above, some models can be trained using preliminary data, such as pre-qualification results. Other models can be trained from actual installations of communication service, showing what different parties decided was actually available and most suitable given the options. For example, prequalification data typically is not entirely accurate, so some locations prequalified for service may not actually be able to receive service as indicated by the pre-qualification results. The data about actual service installation or actual service provided to a location shows which service providers and communication technologies can be conclusively determined to be available since service was actually provided. The decision which provider to choose also indirectly encompasses other types of information. For example, some service providers may not be selected because of technical incompatibility, inflexible contracts, delays in starting service, poor reputation, high pricing, or other factors that are typically not reflected in pre-qualification data but may deter actual use of the service. With information about the set of service providers and communication technologies were predicted to be available and which service providers and communication technologies were subsequently actually chosen and used, machine learning models can predict which of multiple service provider/communication technology combinations is best for different locations.

The techniques described in this document provide a number of improvements and advantages. For example, the use of the machine learning models to determine service availability and service level availability can drastically reduce latency in obtaining accurate information compared with traditional approaches that involved obtaining prequalification data for each location and from each service provider. The technique reduces reliance on third-party systems that provide unpredictable delays. Further, the approach can reduce network bandwidth, as the system using the trained models does not need to request and receive data from a variety of service providers for each network service decision. Even if service providers made pre-qualification data available online, obtaining the information for multiple service providers would involve several network round trips and transfers to obtain the information that the models can provide without any network connectivity requirement.

In addition, the modeling techniques in the application can provide the ability for robust, accurate predictions with a relatively sparse or imprecise data set. Models for service availability and service level availability can be trained from pre-qualification results and used effectively, even though the pre-qualification results used for training are not fully accurate. The use of a third type of model can ensure greater accuracy by incorporating information learned from actual service installation decisions. As discussed below, the machine learning models do not require exhaustive data sets to provide highly accurate predictions.

For example, the models can be configured to provide predictions along a continuous geographical region, even though the training data may include few or no training data examples for certain portions of the region. For example, even though there may no training data for certain zip codes, the models can be trained in a way to still generate appropriately accurate predictions for locations in those zip codes. One of the techniques to achieve this involves training the models using geographical coordinates that remove political or other artificial boundaries. This can allow models to interpret relative distances and better interpolate between training examples. Another technique includes indicating locations to models (during training and prediction phases) in multiple levels of granularity, e.g., zip code, city, county, state, etc. This also can help the models make appropriate inferences, since even if there have not been training examples for a particular zip code or city, for example, the models may learn to use results for the same county or state, or for cities or zip codes nearby to generate a useful prediction.

In one general aspect, a system includes: one or more computers; a network interface to receive a request from a client device over a network, the request indicating a location and a communication service level; a plurality of first machine learning models including at least one first machine learning model for each of multiple service providers or communication technologies, wherein each first machine learning model is trained to predict whether communication service is available from the service provider or communication technology at a location in response to receiving input indicating the location; a plurality of second machine learning models including at least one second machine learning model for each of the multiple service providers or communication technologies, wherein each second machine learning model is trained to predict a level of communication service that the service provider or communication technology provides at a location in response to receiving input indicating the location; a third machine learning model to receive an indication of a location and a set of service providers or communication technologies as input and provide output including an indication of relative suitability for the location of the service providers or communication technologies in the set; and one or more computer-readable media storing instructions that, when executed by the one or more computers, cause the system to (i) receive an indication of a location and a level of communication service, and (ii) provide output indicating a service provider or communication technology selected using the first machine learning models, the second machine learning models, and the third machine learning model.

Implementations may include one or more of the following features. For example, in some implementations, the first machine learning models include at least one first machine learning model for each of multiple combinations of service providers and communication technologies, wherein the first machine learning model for a combination is trained to predict whether communication service is available from the service provider and communication technology of the combination in response to receiving input indicating the location. The second machine learning models include at least one second machine learning model for each of the multiple combinations of service providers and communication technologies, wherein each second machine learning model is trained to predict a level of communication service that the combination of the service provider and communication technology provides at a location in response to receiving input indicating the location. The third machine learning model includes a third machine learning model to receive an indication of a location and a set of combinations of service providers and communication technologies as input and provide output including an indication of relative suitability for the location of the different combinations of service providers and communication technologies in the set.

In some implementations, each of the first machine learning models is trained based on preliminary indications from the corresponding service provider whether communication service is available at different locations. Each of the second machine learning models is trained based on preliminary indications from the corresponding service provider of levels of communication service available at different locations.

In some implementations, the third machine learning model is trained based on records that indicate, for each of multiple locations, (i) one or more service providers that were identified as likely providing communication service at the location and (ii) which of the one or more service providers was actually selected to provide communication service at the location after the one or more service providers were identified as likely providing communication service at the location.

In some implementations, the communication technologies comprise two or more from the group consisting of cable communication, fiber optics, digital subscriber line (DSL), cellular communication, and satellite communication.

In some implementations, each of the first machine learning models, second machine learning models, and third machine learning model includes at least one of a random forest model, an XG boost tree, a logistic regression model, a deep neural network, or a support vector machines (SVM).

In some implementations, one or more of the first machine learning models, the second machine learning models, and/or the third machine learning model includes multiple models arranged as a stacked ensemble model.

In another general aspect, a method performed by one or more computers includes: receiving, by the one or more computers, a request from a client device over a network, the request indicating a location and a communication service level; identifying, from among different service providers or communication technologies, a first subset predicted to provide service at the location, the subset being identified based on outputs generated by multiple first machine learning models each trained to predict service availability for different service providers or communication technologies; selecting, from the first subset, a second subset of service providers or communication technologies each predicted to provide communication service at the location with at least the communication service level indicated in the request from the client device, the second subset being selected based on outputs generated by multiple second machine learning models trained to predict availability of different communication service levels for different service providers or communication technologies; selecting at least one service provider or communication technology from the second subset based on output generated by a third machine learning model that is trained to indicate relative suitability of service providers or communication technologies for locations in response to receiving input indicating (i) a location and (ii) different service providers or communication technologies predicted to provide service at the location with at least the communication service level indicated by the request; and providing, by the one or more computers and to the client device over the network, a response to the request from the client device indicating the selected service provider or communication technology.

Implementations may include one or more of the following features. For example, in some implementations, the identifying the first subset includes identifying, from among different combinations service providers and communication technologies, a first subset of the combinations predicted to provide service at the location, the subset being identified based on outputs generated by multiple first machine learning models each trained to predict service availability for a different one of the combinations of service providers and communication technologies. Selecting the second subset includes selecting, from among the combinations in the first subset, a second subset of combinations each predicted to provide communication service at the location with at least the communication service level indicated in the request from the client device, the second subset being selected based on outputs generated by multiple second machine learning models each trained to predict availability of different communication service levels for a different one of the combinations of service providers and communication technologies. Selecting at least one of the combinations in the second subset includes selecting the at least one of the combinations based on output generated by a third machine learning model that is trained to indicate relative suitability of combinations of service providers and communication technologies for locations in response to receiving input indicating (i) a location and (ii) different combinations of service providers and communication technologies predicted to provide service at the location with an acceptable communication service level. Providing the response includes providing a response indicating the selected at least one combination of service providers and communication technologies.

In some implementations, each of the first machine learning models is trained based on preliminary indications from the corresponding service provider whether communication service is available at different locations. Each of the second machine learning models is trained based on preliminary indications from the corresponding service provider of levels of communication service available at different locations.

In some implementations, the third machine learning model is trained based on records that indicate, for each of multiple locations, (i) one or more service providers that were identified as likely providing communication service at the location and (ii) which of the one or more service providers was actually selected to provide communication service at the location after the one or more service providers were identified as likely providing communication service at the location.

In some implementations, the request is received through an application programming interface, and the response is provided through the application programming interface.

In some implementations, identifying the first subset of the combinations includes: obtaining, for each of the multiple first machine learning models, a service availability confidence score indicative of a likelihood that the corresponding combination of service provider and communication technology is provided at the location; and selecting, as the first subset, combinations for which the service availability confidence score satisfies a threshold. Selecting a second subset of combinations includes: obtaining, for each of the multiple second machine learning models corresponding to the combinations in the first subset, a set of service level confidence scores respectively indicative of a likelihood that different communication service levels are provided at the location by the combination of service provider and communication technology corresponding to the second machine learning model; and selecting, as the second subset, combinations for which the sets of service level confidence scores satisfy a threshold for a service level that meets or exceeds the communication service level indicated by the request.

In some implementations, receiving the request includes receiving a request indicating a set of multiple locations. The method includes: generating, using the first machine learning models and the second machine learning models, measures of predicted availability of service for the respective service providers or communication technologies across the set of multiple locations; and providing the measures in response to the request.

In another general aspect, a method performed by one or more computers includes: generating, by the one or more computers, first machine learning models including at least one first machine learning model for each of multiple service providers or communication technologies, wherein each first machine learning model is trained to predict whether communication service is available from the service provider or communication technology at a location in response to receiving input indicating the location; generating, by the one or more computers, second machine learning models including at least one second machine learning model for each of the multiple service providers or communication technologies, wherein each second machine learning model is trained to predict a level of communication service that the service provider or communication technology provides at a location in response to input indicating the location; generating, by the one or more computers, a third machine learning model configured to (i) receive input including an indication of a location and a set of service providers or communication technologies, and (ii) provide output including an indication of relative suitability for the location of the service providers or communication technologies in the set; and providing, by the one or more computers and over a communication network, an interface configured to (i) receive an indication of a location and a level of communication service, and (ii) provide output indicating a service provider or communication technology selected using the first machine learning models, the second machine learning models, and the third machine learning model.

Implementations may include one or more of the following features. For example, in some implementations, generating the first machine learning models includes generating at least one first machine learning model for each of multiple combinations of service providers and communication technologies, wherein the first machine learning model for a combination is trained to predict whether communication service is available from the service provider and communication technology at a location in response to receiving input indicating the location. Generating the second machine learning models includes generating at least one second machine learning model for each of the multiple combinations of service providers and communication technologies, wherein the second machine learning model for a combination is trained to predict a level of communication service that the service provider and communication technology provides at a location in response to input indicating the location. Generating the third machine learning model includes generating a third machine learning model configured to (i) receive input including an indication of a location and a set of combinations of service providers and communication technologies, and (ii) provide output including an indication of relative suitability of the service providers in set of service providers for the location. Providing the interface includes providing, by the one or more computers and over a communication network, an interface configured to (i) receive an indication of a location and a level of communication service, and (ii) provide output indicating one or more combinations each including (i) a service provider and (ii) a communication technology, wherein the combinations are selected using the first machine learning models, the second machine learning models, and the third machine learning model.

In some implementations, each of the first models is trained based on preliminary indications from the corresponding service provider whether communication service is available at different locations, and each of the second models is trained based on preliminary indications from the corresponding service provider of levels of communication service available at different locations.

In some implementations, the third machine learning model is trained based on records that indicate, for each of multiple locations, (i) one or more service providers that were identified as likely providing communication service at the location and (ii) which of the one or more service providers was actually selected to provide communication service at the location after the one or more service providers were identified as likely providing communication service at the location.

In some implementations, the communication technologies comprise two or more from the group consisting of cable communication, fiber optics, digital subscriber line (DSL), cellular communication, and satellite communication.

In some implementations, each of the first machine learning models, second machine learning models, and third machine learning model includes at least one of a random forest model, an XG boost tree, a logistic regression model, a deep neural network, or a support vector machines (SVM).

In some implementations, one or more of the first machine learning models, second machine learning models, or third machine learning model includes multiple models arranged as a stacked ensemble model.

In some implementations, the method comprises: grouping pre-qualification data from a particular service provider related to a particular communication technology by zip code; and determining, for each of the groups of prequalification data: a set of geographical coordinates representing the zip code for the group; and a service availability ratio of (i) a number of prequalification results in the group that indicate available service for the particular service provider and the particular communication technology and (ii) a total number of prequalification results in the group or a number of prequalification results in the group that indicate service is not available using the particular service provider and the particular communication technology. Generating the first machine learning models includes training a particular first machine learning model for the particular service provider and the particular communication technology, wherein the particular first machine learning model is trained using each of the groups as training examples, with the determined set of geographical coordinates for a group indicated as an input to the particular first machine learning model and the determined ratio for the group being used as a target output for the particular first machine learning model.

In some implementations, the method comprises: grouping pre-qualification data from a particular service provider related to a particular communication technology by zip code; and determining, for each of the groups of prequalification data: a set of geographical coordinates representing the zip code for the group; and a service level ratio, for each of multiple service levels, of (i) a number of prequalification results in the group that indicate that the particular service provider and the particular communication technology provide communication service at the service level and (ii) a total number of prequalification results in the group or a number of prequalification results in the group that indicate that service level is not available using the particular service provider and the particular communication technology. Generating the second machine learning models includes training a particular second machine learning model for the particular service provider and the particular communication technology, wherein the particular second machine learning model is trained using each of the groups as training examples, with the determined set of geographical coordinates for a group used as an input to the particular second machine learning model and the determined service level ratios for the group being used as target outputs for the particular first machine learning model.

Other embodiments include corresponding systems, apparatus, and software programs, configured to perform the actions of the methods, encoded on computer storage devices. A device or system of devices can be so configured by virtue of software, firmware, hardware, or a combination of them installed so that in operation cause the system to perform the actions. One or more software programs can be so configured by virtue of having instructions that, when executed by data processing apparatus, cause the apparatus to perform the actions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3 and 4 are examples of user interfaces for providing information regarding predicted availability of network service.

Like reference numbers and designations in the various drawings indicate like elements.

DETAILED DESCRIPTION

Figure 1:
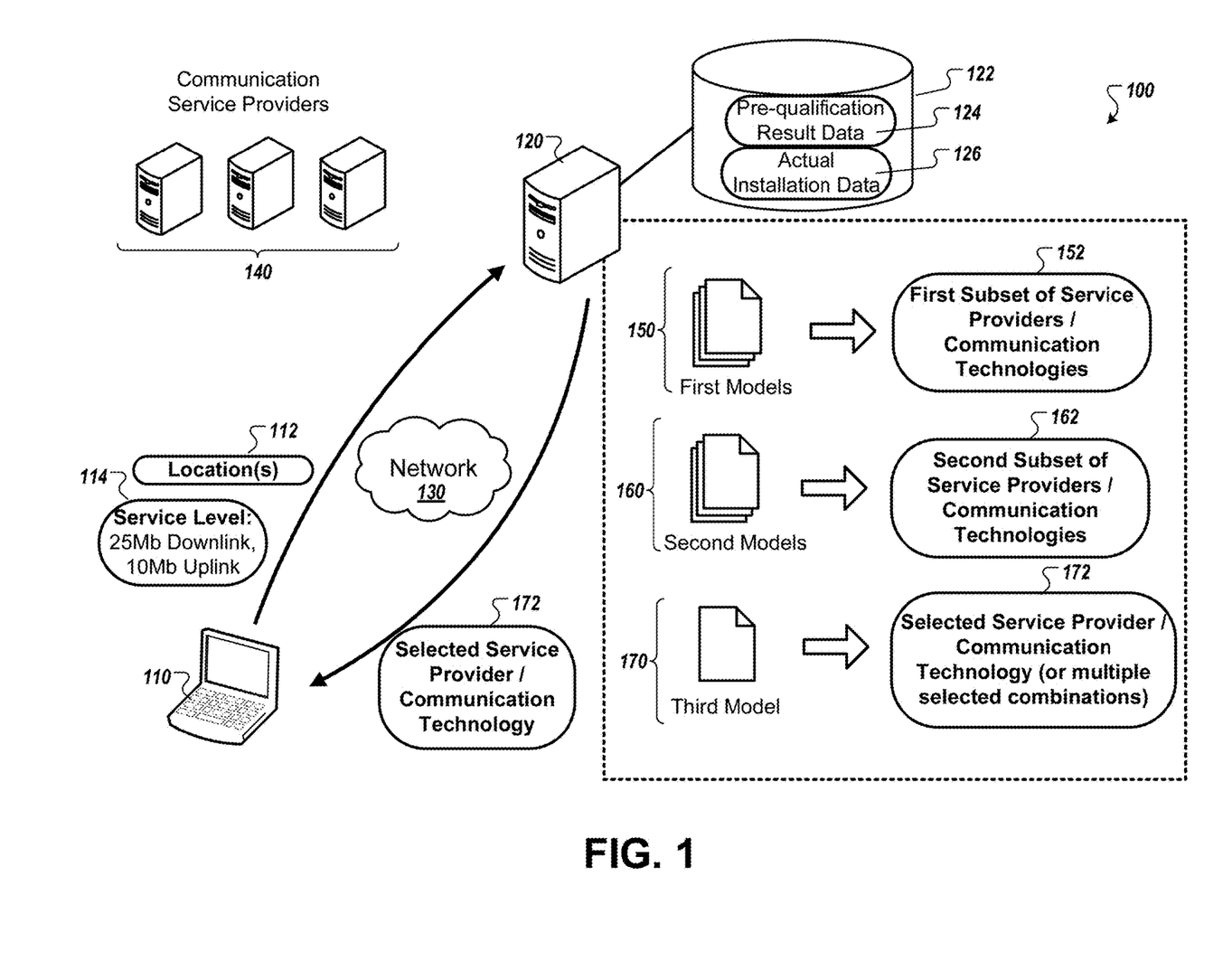
FIG. 1 is a diagram that illustrates an example of a system for determining availability of network service.

FIG. 1 is a diagram that illustrates an example of a system 100 for determining availability of network service. The system 100 includes a client device 110, a computing system 120, a network 130, and computing systems 140 for various service providers. The example of FIG. 1 shows how the computing system 120 can generate and provide estimates of the communication service options available at different locations based on different types of machine learning models 150, 160, and 170. Notably, using the models 150, 160, and 170, the computing system 120 can generate the estimates very quickly. Once the client device 110 requests information about the connectivity options for a location, the computing system 120 can then generate and provide the information independent of computing systems 140 for the service providers that potentially could provide service at the location.

The system 100 uses machine learning techniques to determine which service providers and technologies would be best suited for the communication requirements of a particular site. A site may be identified primarily by geographical location of the site (e.g., latitude and longitude, zip code), and service level requirements can represent desired upload and download speeds, and potentially other customer or site-specific requirements, such as requirement for having a fixed public IP address. Machine learning classification models learn from existing records collected over a period of time, often a year or more. The models can then be used to determine appropriate connectivity options for new sites not described in the previous data, for example, which service providers and technologies would be available for a site, which service levels (e.g., upload and download speeds) are available for a site, and which is the best available service provider and technology combination for a site. The proposed machine learning models may represent geographical locations with latitude and longitude or other geographical coordinates, which allows the models to encode a sense of distance between locations indicated in training data and thus provide accurate predictions for locations for which no previous data exists (e.g., by using patterns and proximity to other locations for which historical data does exist).

The techniques can be used as a Machine Learning as a Service (MLaaS) platform for remote users to obtain service availability predictions for new sites using models that have already been trained on historical data. For example, the client device 110 can request information and receive predictions through an application programming interface (API), a web page, an application, or other interface on an on-demand basis.

The client device 110 can be any appropriate device input from and output to a user, for example, a desktop computer, a laptop computer, a tablet computer, a smartphone, and so on.

The network 130 can include one or more wired or wireless networks, and can include private and/or public networks, including the Internet. The computing systems 140 represent server systems for different communication service providers. These systems 140 can provide information indicating expected and/or actual availability of network service for different locations. This can take the form of prequalification data or responses to queries regarding specific locations. As another example, these computing systems 140 can provide map data, coordinates, or other data indicating where the respective communication service providers provide service and the type or level of service of provided.

The computing system 120 can include one or more computers, such as a server system. The computing system 120 may be implemented as a group of computers or processors that are in one location or are distributed in multiple locations.

The computing system 120 is in communication with one or more data storage devices 122, which store a database of information about network service availability. This information can include pre-qualification data 124, e.g., the accumulated results of responses from the various computing systems 140 in response to service availability queries over time. The stored information can also include installation data 126, such as records of which technology and service provider combination was actually installed for various locations.

The computing system 120 uses three different types of machine models to generate information about the availability of communication service options: multiple first machine learning models 150, multiple second machine learning models 160, and one or more third machine learning models 170. The first models 150 and second models 160 are trained using preliminary indications of service availability from service providers, while the third machine learning model 170 is trained using information about actual service installations.

The first models 150 can be service availability models, used to predict whether service is offered for different service providers and communication technologies. The first models 150 can include a different model for each combination of service providers and communication technologies that are potentially available. For example if there are four service providers considered and each service provider offers four different communication technologies for network access (e.g., cable, fiber optics, DSL, and cellular), then there may be twenty first models 150. For example, the models 150 can include one model representing the first provider providing service using cable network connection, another model for the first provider providing service using a fiber optic connection, another model for a second provider providing service with a cable connection, and so on. Of course, different service providers may offer service with differing numbers and types of communication technologies. The specific service provider and communication technology combinations used can be combinations identified in records in the database represented by storage devices 122, such as combinations determined to occur in pre-qualification data 124 and/or actual installation data 126 at least a minimum number of times.

The first models 150 are respectively trained to predict whether communication service is available from the different service provider/communication technology combinations. In training of each first model 150, examples from the prequalification data corresponding to the appropriate provider/technology combination are extracted, and the system determines, for each example, the location for the pre-qualification request and the result from the service provider (e.g., whether service is provided or is not provided). The examples are then used to train the model for that combination to predict whether service is available based on location. In the example, each first model 150 corresponds to a specific service provider/communication technology combination, and is trained to make classification decisions whether different locations are likely to have service available with the combination. Each first model 150 can be configured to receive inputs indicating locations, and to provide for each indicated location a probability, score, or other data indicating how likely service is to be available at the locations in response to the location input. In some implementations, each first model 150 is configured to receive an input indicating a location, and in response, to generate a confidence score indicating a likelihood that service is available at the indicated location using the particular communication technology and service provider combination corresponding to the model.

The second models 160 can be service level models, used to predict the level of service (e.g., available bandwidth, reliability, or other measure of the capabilities of communication service) provided by different service providers and communication technologies. The second models 160 can include a different model for each combination of service providers and communication technologies that are potentially available. For example, there may be the same number of second models 160 as there are first models 150.

The second models 160 can be trained based on the pre-qualification data 124 to predict the highest level of service provided at different locations. In some implementations, a discrete set of service levels is defined. For example, five service levels may be defined, each corresponding to a different set of uplink and downlink bandwidths, e.g., with levels corresponding to download/upload speeds of least: 0.5 Mb/0.1 Mb; 5.0 Mb/2.0 Mb; 15 Mb/5 Mb; 30 Mb/15 Mb; and 50 Mb/25 Mb or greater. More or fewer levels and levels with different performance criteria may be defined. The various second models 160 can each be trained to indicate, for each location indicated at the input to the model 160, a likelihood score for each of the different service levels. For example, for a given model receiving a location input, a first output score in an output vector may indicate a likelihood or confidence that the provider/technology combination corresponding to the model will provide the first level of service at the location; a second output score in the output vector may indicate the likelihood or confidence that the same combination will provide the second level of service at the location; and so on.

During training of each of the second models 160, the computer system extracts from the pre-qualification data 124 examples of the highest service levels for the service provider and technology combination corresponding to the model 160. For example, instances of pre-qualification reports for a specific service provider/communication technology combination are extracted, with each example having a location and information about the level of service that a service provider has claimed to be available at the location. The service levels indicated in the pre-qualification data 124 are mapped to one of the discrete service level labels. The model 160 is then trained using the examples to learn the distribution of service levels present across various graphical areas. After training, each model 160 is capable of receiving data indicating a location and in response predicting a level of communication service that the particular service provider/communication technology combination likely provides at the location.

As noted above, the output of each second model 160 can be a vector, e.g., a set of scores including a separate score for each of the multiple discrete service levels. Each score can indicate a likelihood that, for a corresponding service level is available at a location specified by input to the model 160. For example, using the example of five service levels discussed above, each second model 160 may output five scores for each location input. One of the scores provides a likelihood that the first service level would be provided, another giving a likelihood that the second service level would be provided, and so on. As an example, the set of scores output by one of the models 160 may be [0.99, 0.98, 0.92, 0.7, 0.6] for a location. The initial score of "0.99" shows a very high confidence that the first service level (e.g., at least 0.5 Mb download/0.1 Mb upload in the example above) can be provided at the location by the provider/technology combination for the model, but the other scores show progressively lower confidence that the combination can provide the higher bandwidth of the other service levels at the location. As another example, the second models 160 may indicate binary scores indicating whether the service levels are provided by the various combinations, e.g., [1, 1, 1, 0, 0] to indicate that the first three service levels are expected to be provided but the last two service levels are not.

The first models 150 and second models 160 can split the function of predicting whether service is available and predicting which service levels are available. This separation may be reflected in the second models 160 being conditional on there already being an indication that service is available. In other words, the predictions of the second model can be, in essence, a prediction made given that service has been determined to be available at a location.

The third machine learning model 170 can be a suitability model used to rank or compare various provider/technology combinations. In particular, the third model 170 can be used to select the most suitable combination for a location, from among multiple provider/technology combinations that have been determined to be (i) sufficiently likely to have service provided at the location, according to output of the first models 150, and (ii) sufficiently likely to provide a level of service that meets the needs at the location, according to output of the second models 160. In other words, after the first models 150 and second models 160 are used to identify a subset of provider/technology combinations that are likely to provide service that meets the performance requirements of a location, the third model 170 is used to be able to evaluate the relative merits of the combinations in the set. For example, the model 170 may provide scores, such as a probability distribution over the set of provider/technology combinations, that can be used to rank the combinations. The combination having the score representing the greatest likelihood can represent the best option for network service.

The use of the third model 170 can indirectly incorporate information about many advantages and disadvantages of service options, including technological and non-technological factors can lead users to select certain provider/technology combinations over others. By training the model 170 with data indicating which provider/technology combinations were actually installed (e.g., the actual install data 126), the third model 170 may learn the trends and patterns of choices that have been made by different parties, allowing the third model 170 to offer predictions that align with those trends. Thus, output of the third model 170 may implicitly follow the preferences and analysis that led to the installation choices indicated in the actual installation data 126.

The third model 170 also provide a type of quality assurance to the output of the system 120. The first models 150 and second models 160 are trained based on pre-qualification data, which are estimates of service availability and capabilities that are not always accurate. The third model 170, on the other hand, is trained using actual installation data 126, so the records provide examples where service is verified to actually be available. In effect, the output of the third model 170 can help filter out predictions of the first models 150 and second models 160 that are not accurate, whether the inaccuracy is due to modelling error, changes in offerings of service providers, inaccuracy of the underlying prequalification data used for training, or other reasons. This allows the first models 150 and second models 160 to be trained with data that is approximate or not entirely accurate, since the output of the third model 170 can be used to correct or filter out provider/technology combinations incorrectly indicated to be available by the other models.

The processing of the third model 170 can reflect constraints and information not used in training the models 150, 160. For example, the third model 170 can be trained based on actual install information 126, reflecting actually installations of service where service is known to occur, not the prequalification data 124 which may often represent a tentative or unverified assertion by the service provider. Further, the actual installation data 126 reflects the actual installation choices made by users or organizations for various locations, which may be based on other factors such as network capabilities beyond those indicated in the service level, such as pricing, contract terms, quality of customer support, lead time to establish service, and so on. The scores of the third model 170 thus can provide scores to rank the different provider/technology combinations for a location, with the scores being based on statistical measures of how others have selected service in nearby areas.

The input to the third model 170 can include a variety of information about the network service needed, for example, data indicating the location for service, an indication of the service level desired, and data indicating the provider/technology combinations determined to likely to provide the desired level of service. The output of the third model 170 can include a score for each of the different provider/technology combinations that the computing system 120 considers. For example, the output scores can indicate likelihoods that the different provider/technology combinations would be installed given the input of the location, the service level requirement, and the set of estimated or pre-qualified provide/technology combination options.

Still referring to FIG. 1, an example of using the computing system 120 to determine service providers and communication technologies is provided. Initially, a user of a client device 110 access is an interface to request information about availability of network service. Using the interface, the user enters a list of geographical locations 112 where network service is desired. The user also enters service level requirements 114 that specify the required capabilities of the network service. These service level requirements 114 may include uplink and downlink bandwidth requirements. The service level requirements 114 may additionally or alternatively specify other constraints, such as a static IP address, a data cap minimum or unlimited data capability, wireless or wired access, and so on.

The client device 110 sends data indicating the geographical locations 112 and the service level requirements 114 to the computing system 120 over the network 130. The computing system 120 then uses the machine learning models 150, 160, 170 to determine which service providers and communication technologies would most likely provide service that meets the requirements of the user at the locations specified by the user. As discussed above, the determination can be made rapidly, and without contacting the communication service providers 140.

When the user has specified multiple locations 112, the computing system makes a determination for each location individually. Then, the results for each individual location are prepared and combined to determine, if possible, one or more service provider/communication technology combinations that would meet the needs at all of the locations or at least various groups of the locations.

To determine the options for a location, the computing system 120 provides input indicating the location to each of the first models 150. In response, each of the first models 150 provides output indicating whether the provider/technology combination corresponding to that model is likely to provide service at the location. From those outputs, the computing system 120 selects a first subset 152 of provider/technology combinations. For example, the computing system 120 can apply a predetermined threshold to the model output, for example, to select provider/technology combinations for which the model output indicates a confidence score of 50% or greater.

The computing system 120 evaluates, for each of the provider/technology combinations in the first subset 152, whether those combinations would meet the service level requirements 114. To do this, the computing system 120 provides data indicating the location of interest to each of the second models 160 for the combinations in the first subset 152. Each of those second models 160 then provides output indicating whether each of multiple service levels are likely to be provided by the provider/technology combination corresponding to the model. For example, each of the second models 160 that is used can provide a score with respect to each of multiple predetermined service levels.

With the outputs of the second models 160, the computing system 120 narrows down the first subset 152 to a second subset 162. This involves comparing the outputs of the second models 160 with a service level threshold, for example 50% confidence level indicated by the model outputs. Combinations from the first subset 152 are included in the second subset 162 if the corresponding output has at least one service level score that satisfies the service level threshold and meets the service level requirements 114.

The computing system 120 provides input to the third model 170 based on the combinations in the second subset 162. The input can include: data indicating the location; data indicating the service levels that would satisfy the user's service level requirements 114; and data indicating the provider/technology combinations in the second subset 162. Based on these inputs, the third model 170 provides output that allow the computing system 120 to determine which provider/technology combinations are expected to be suitable for the location. For example, the third model 170 may provide a likelihood score or confidence score for each provider/technology combination that the third model 170 is trained to evaluate. The computing system 120 can then apply a suitability threshold to the scores and select the combinations that have scores satisfying the threshold.

The computing system 120 repeat this process using the first models 150, the second models 160, and the third model 170 for each of the locations 112. After a set of provider/technology combinations is selected for each of the locations 112, the computing system 120 evaluates the different sets to determine overlap and determine if there are provider/technology combinations that would satisfy the needs of all the locations 112.

The computing system 120 generates and sends a response to the client device 110 indicating the selected provider/technology combinations. The data can indicate, for example, the combinations that are predicted to meet the needs at all locations, or those that meet the needs of certain groups of the locations 112. The data can also include the selected set 172 of combinations for each individual location. The client device 110 receives and presents the information to the user.

Figure 2:
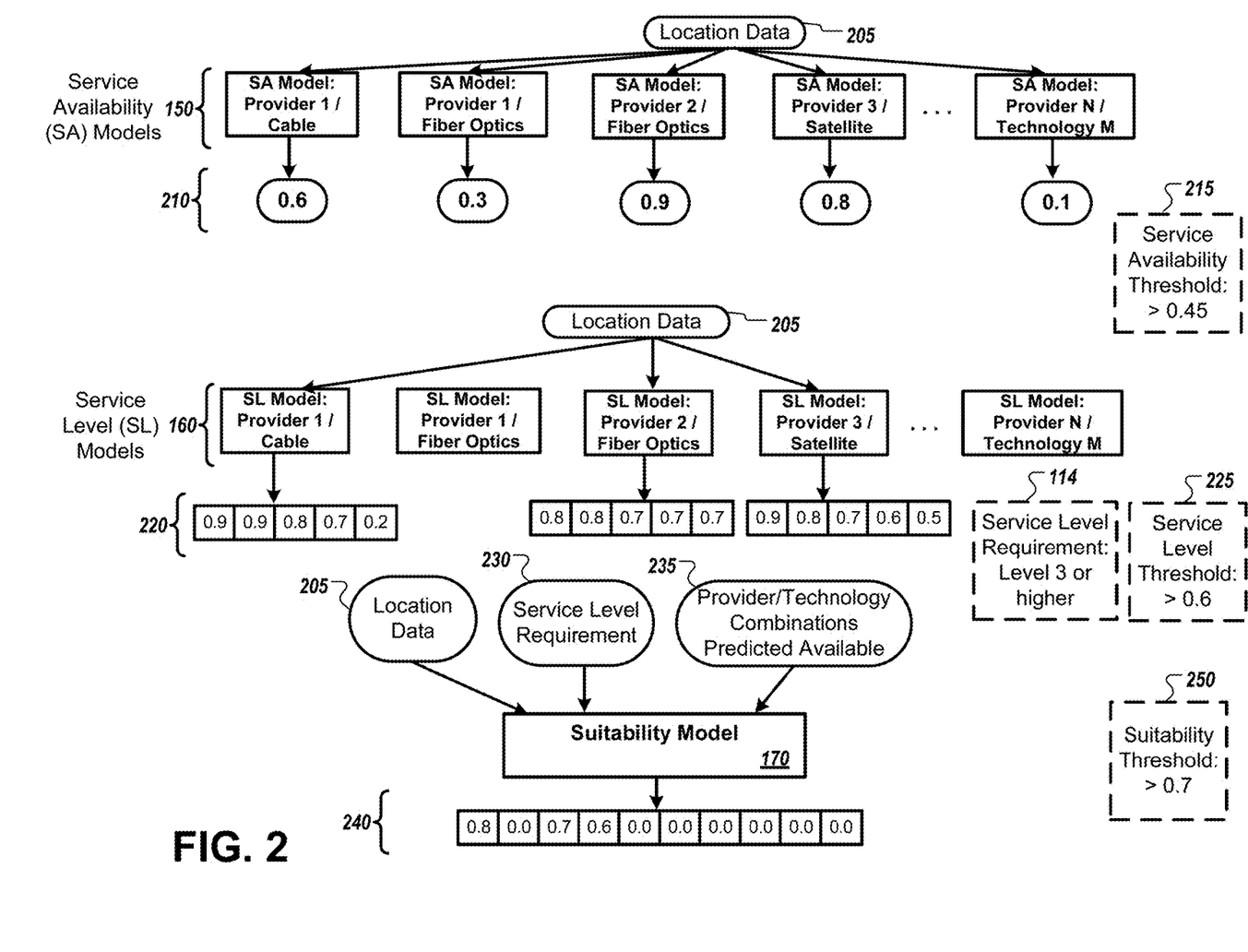
FIG. 2 is a diagram that illustrates another example of determining availability of network service.

FIG. 2 is a diagram illustrating the use of the models 150, 160, 170 in greater detail. The example shows the processing for a single geographical location, and the functions shown can be repeated for various locations to generate a response to a request.

The input to each of the first models 150 is location data 205. In some implementations, the location of interest is expressed in multiple different forms in the location data 205. For example, the computing system 120 can take a street address for location and determine the ZIP Code or other postal code for the location. Other expressions for the location differing levels of granularity can also be determined and used. For example, GPS coordinates for the location, city, county, state, country, and/or other forms of expressing location can also be used. The GPS location used can be general GPS location, such as a central GPS location for the ZIP Code in which the location of interest is located. By providing location data 205 in multiple forms having different levels of precision during training and when making predictions, the machine learning models 150 (and models 160 and 170) can implicitly learn spatial relationships to a degree. This can compensate for gaps in the examples used for training the models. For example, even if training data does not include examples for a particular ZIP Code, the training data may include examples for the city or county that includes the ZIP Code, allowing the model to generalize and at least in some cases rely on observed characteristics of broader geographical areas that do match or are near the location of interest.

As shown in FIG. 2, there is a first model 150 for each combination of service provider and communication technology being considered. Each of the models 150 generates an output score 210, which indicates a probability or confidence measure of how likely the corresponding combination is to provide service at the location indicated by the location data 205. A predetermined service availability threshold 215 is used to evaluate the output scores 210. In the example, output scores 210 that have a value greater than 0.45 are accepted as likely providing service. The actual value of the threshold 215 may vary depending on the set of models 150 used and Can be empirically determined to meet accuracy standards, e.g., to limit the number of false positives or false negatives. In the example of FIG. 2, three of the output scores 210 meet the threshold 215, and the provider/technology combinations for those scores would be included in the first subset 152.

Next, the computing system 120 uses the models 160 to assess which provider/technology combinations are likely to meet the service level requirements 114 that the user has specified. The computing system 120 provides the location data 205 as input to each of the second models 160 corresponding to combinations with output scores 210 that satisfied the threshold 215. In response, the models 160 each output a set of scores 220. Multiple predetermined service levels are defined in advance, before or during training of the models 160. The second models 160 have been trained to predict whether service at locations specified by input would likely provide those different levels of service. In the example, there are five different levels of service, corresponding to different uplink and down link speeds and potential representing other types of requirements. Each second model 160 that receives the location data 205 generates a set of output scores 220 indicating the probability or confidence level that the corresponding provider/technology combination would provide that service level.

The computing system also applies a service level threshold 225 to identify service levels that have a sufficiently high likelihood of being provided. In the example, the service level threshold 225 is 0.6, so that scores 220 above this threshold are considered to be likely provided at the location indicated by the location data 205. The computing system 120 then evaluates the provider/technology combinations to determine which ones are predicted to provide at least one service level that meets the service level requirements 114 that the user has specified. In the example, the user has specified a need for at least the third level of the five possible levels defined.

In some implementations, the service levels are defined so that higher levels encompass the requirements of lower levels, so that, for example, providing service at level four also satisfies the requirements of each of service levels one through three. In other implementations, different scores 220 may be provided for different types of requirements, for example, with some scores 220 representing the availability of a static IP address, and some scores representing different bandwidth requirements, and so on. The computing system may consider individual scores 220 and/or combinations of multiple scores 220 for any given provider/technology combination to determine if that provider/technology combination satisfies the requirements 114. In the example, each of the provider/technology combinations predicted to be available at the location of interest are predicted to provide the needed service level, e.g., service level three or higher.

The computing system 120 uses the third model 170 to evaluate the provider/technology combinations further. As input, the third model 170 receives the location data 205, service level requirement data 230 indicating which service levels meet the service level requirement 114, and prediction data 235 indicating the provider/technology combinations predicted to be available and to have an appropriate service level available, e.g., as determined based on evaluation of the scores 220.

The service level requirement data 230 can include a value for each of the predetermined service levels that would meet the service level requirement 114. Similarly, the prediction data 235 can include a value for each of the provider/technology combination the computing system 120 is configured to consider. If the computing system 120 is considering twenty different combinations (and so uses twenty first models 150 and twenty second models 160) there would be twenty values for this portion of the input. Each of the values can indicate whether the corresponding provider/technology combination is predicted to be available (based on outputs 210 of the first models 150) at a location and is predicted to have a service level that meets the minimum requirements at the location (based on outputs 220 of the second models 160). The values may be binary to indicate whether a provider/technology combination meets the criteria. As another example, the scores may be non-binary, for example, to indicate a likelihood or confidence that a combination meets the needed criteria, for example, determined as a function of the scores 210 and 220.

The third model 170 can provide output scores 240, such as a set of values that indicate the relative suitability of the various provider/technology combinations. The output sores 240 can include a score for each provider/technology combination representing how likely that combination is to be suitable for the location of interest.

The computing system 120 evaluates the output scores 240 using a suitability threshold 250 to determine which provider/technology combinations have an output score 240 that meets the threshold 250. Combinations that do have scores 240 meeting the threshold 250 are selected as the set recommended to the user for the location of interest, e.g., as the selected set 172 shown in FIG. 1.

In some implementations, when the third model 170 is trained, the prediction data 235 used in the training process is the set of provider/technology combinations that prequalification data 124 indicated to be available options. Thus, the examples used in training can show which combination was actually installed (e.g., from the actual installation data 126) from among the options available when the choice was made (e.g., determined from the prequalification results indicated by the prequalification data 124).

As noted above, the format of the location data 205 can provide robustness to the predictions of the system. For example, the nature of the latitude and longitude measure automatically encodes a sense of distance thus the model is able to provide results for locations for which no historical prequalification data exists by automatically determining best possible results from nearby locations for which prequalification results do already exist. This is better than using a rule based approach, because the rules might have to be different for different areas and would need to be manually determined. The techniques discussed in this document allow the machine learning modes to automatically learn the possible non-linearities in the data, thus making it more robust and accurate than a naïve rule-based approach. For new locations that exist in a zip code for which no prequalification information is available the prequalification success percentage is set to be the same as the prequalification success percentage of the city in which the zip code exists;

similarly if the data does not exist for the city, the value for the county is used; and so on to the next larger geographical unit.

During training of the models 150, 160, 170, each model can have its own data set extracted from the data stored in the storage devices 122. In particular, each of the models 150, 160 will have a training data set representing prequalification results for the specific provider/technology combination that corresponds to those models.

In some implementations, the models 150, 160, 170 may be trained based on aggregated data for geographical areas rather than training based on each prequalification record individually. For example, from the training data set for a provider/technology combination, the computing system 120 may aggregate data for certain geographical areas, such as ZIP Codes. For each geographical area (e.g., ZIP Code), the computing system determines a rate at which prequalifications have been successful. This rate for the area may be a ratio of (i) a number of prequalification requests for the provider/technology combination that resulted in an indication that service is available in the ZIP Code, and (ii) a total number prequalification requests for the provider/technology combination that were made for the ZIP Code. Success rates determined in this manner can be used as the training target for the models 150. For example, for the models 150 can be trained so that, given a location input in a particular ZIP code, the models 150 output a score indicative of the rate of prequalification success (e.g., indication that service is available) that corresponds to the provider/technology combination for the model 150. In a similar manner, the models 160 can be trained to use success rates for prequalification for availability of different service levels.

In general, the training data sets are each broken into multiple train-test split and K-fold cross-validation technique is used to avoid overfitting to the training data.

Each machine learning model 150, 160, 170 can be a model such as a random forest model, an XG boost tree, a logistic regression model, a deep neural network, a support vector machine (SVM), a maximum entropy classifier, or another type of model. Although models are discussed individually, each model may actually comprise multiple models, e.g., as an ensemble model. For example, to make the predictions more robust, each of the models 150, 160, 170 may include multiple machine learning models, including models of different types or models trained with different data sets or parameters. The output of multiple component models can be combined as a stacked ensemble to provide the smallest prediction error on test data. In the case of the models 150, 160, the predictions made during training are then compared against previously known prequalification results for that geographical area (such as the county city in which the site is located) to determine if the results are consistent with the historically available data. Evaluating the prediction with respect to currently known results may be used as an initial indicator of the correctness of predictions.

To determine the accuracy of the machine learning models, the machine learning predictions as well as new prequalification results from the computing systems 140 are obtained for new sites not represented in the training data. The results from the actual prequalification process are compared with the results determined using the machine learning models. The new prequalification results may be continuously added to the training dataset used for the machine learning models, thus making them better and better over time. Once the accuracy of the machine learning models exceeds an acceptable threshold, then the machine learning models can potentially replace the prequalification process. Instead of doing prequalification for every site, the prequalifications are done only periodically and for just enough sites spread nationwide to keep the training data current. The term accuracy is not used here to represent just a single measure (i.e. what fraction of machine learning predictions matched the actual prequalification results) but is used in a more general sense of how well the model predictions reflect actual availability of service. As with any classification model, the true positive rate, false positive rate, true negative rate, and false negative rate can all be assessed to determine the effectiveness of a model.

Figure 3:
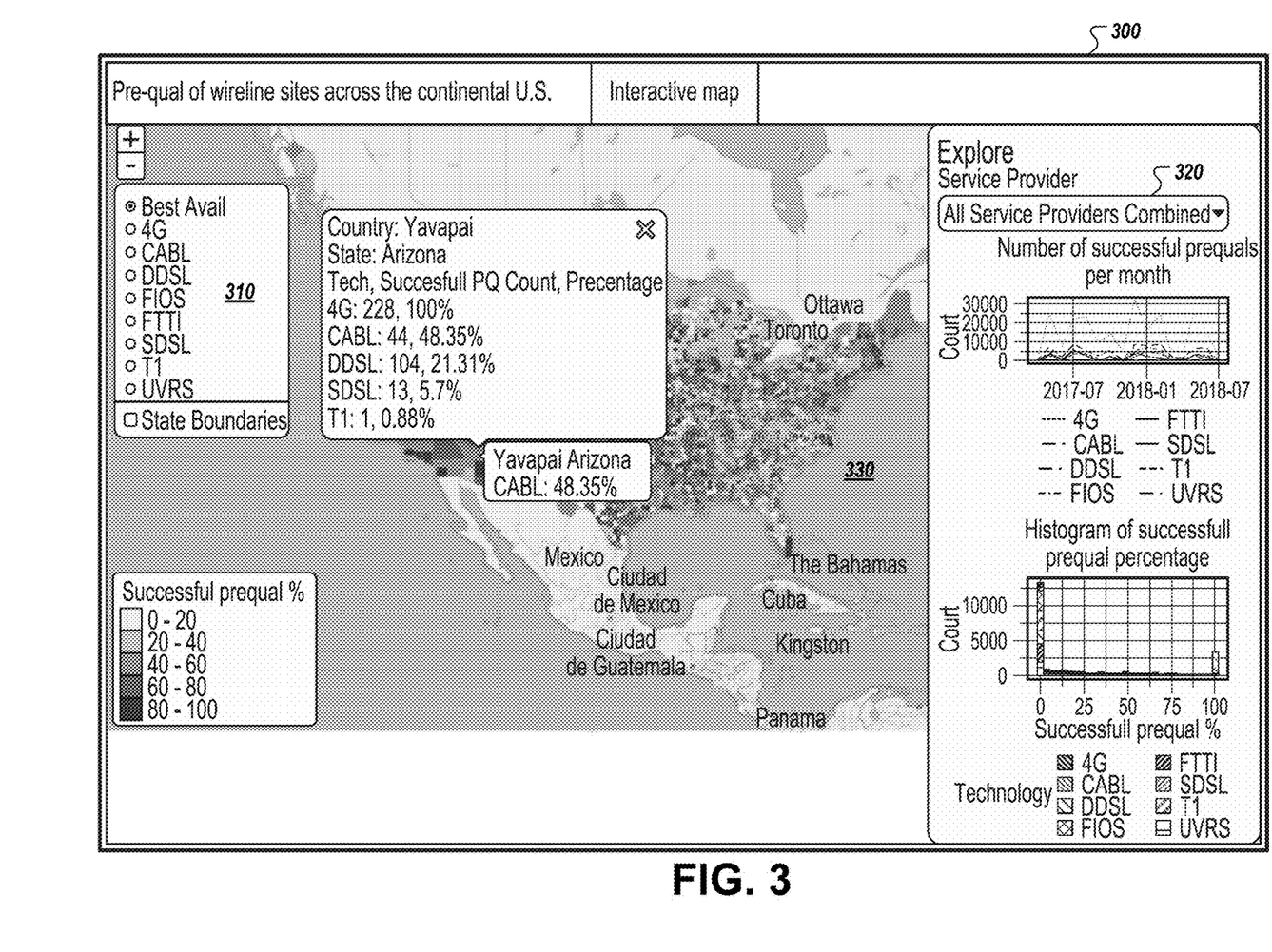

FIG. 3 is a diagram illustrating a user interface 300 that indicates service availability for a geographical area. The user interface 300 includes controls 310 that allow a user to narrow the set of service providers and/or communication technologies considered. For example, on the left of the user interface 300 there are controls 310 that allow the user to select one of multiple different communication technologies (e.g., 4G wireless, cable, fiber optics, etc.) or an aggregate of multiple technologies (e.g., to show the best available option among multiple technologies.) On the right side, there is a control 320 to select individual service providers or combinations of service providers.

Based on the providers and technologies the user selects, the user interface is updated to show, on a map 330, the rate that prequalification determinations show service availability for different regions. The rates indicated on the map 330 can be based on actual success rates of prequalification requests made to, and answered by, the service providers. In some implementations, the user interface indicates predicted likelihoods of successful availability based on the outputs of the machine learning models 150, 160, 170. For example, rather than indicating actual prequalification results from the service provider, the map data can indicate likelihoods or confidence scores determined by models 150 for the different areas, or may indicate the likelihoods or confidence scores determined by the model 170 for the areas.

FIG. 4 is a diagram showing a user interface 400 for requesting and viewing results of service availability predictions. The interface includes controls 410 to upload a list of locations of interest. The client device 110, on receiving such a list, queries the computing system 120 to obtain service availability predictions for the locations in the list. On the right-hand half of the user interface 400, the locations in the list are displayed. The items in the list 420 are selectable, allowing a user to select any of the items to show a map 430 of the location and information 440 about predicted service availability at the location. This information can include, for example, a list of provider/technology combinations that are predicted to have availability for the location and predicted rates of prequalification success. In some implementations, the user may select controls on the user interface to show a list view of prediction results for each of the items in the list 420, in addition to or instead of indicating the locations themselves.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented, in part, as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatuses, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

What is claimed is:

1. A method for operating a computing system, the method comprising:
    receiving input including a location at which a communication service to be provided and a selected one of a plurality of service providers and communication technologies for providing the communication service;
    generating a first machine learning model for each of multiple the plurality of service providers and communication technologies,
        wherein the first machine learning model is trained to output, based on the input, a first value that indicates a predicted likelihood of availability of the communication service from the selected one of the plurality of service providers and communication technologies at the location;
    generating a second machine learning model for the plurality of service providers and communication technologies,
        wherein the second machine learning model is trained to output, based on the input, a second value that indicates a predicted level of the communication service as provided by the selected one of the plurality of service providers and communication technologies at the location;
    generating a third machine learning model, the third machine learning model being trained based on data indicating specific ones of the plurality of service providers and communication technologies that different users have previously selected and not selected for use at multiple locations,
        wherein the third machine learning model is configured to
            receive the input, and
            output a third value that indicates a measure of suitability of the selected one of the plurality of service providers and communication technologies based on actual service selected and not selected for use by the different users at the location; and
    providing an interface configured to
        receive the input from a user, and
        provide information to the user indicating availability of the communication service at the location based on the first value, the second value, and the third value from the first machine learning model, the second machine learning model, and the third machine learning model, respectively,
    wherein providing the information includes
        determining whether the first value satisfies a first predetermined threshold representing a minimum likelihood of availability of the communication service at the location,
        determining whether the second value satisfies a second predetermined threshold representing a minimum predicted level of the communication service at the location, and determining whether the third value satisfies a third predetermined threshold representing suitability of the communication service at the location.

2. The method of claim 1,
wherein the input includes a selection of at least two of the plurality of service providers and communication technologies for the communication service;
wherein generating the first machine learning model comprises generating a different machine learning model for each combination of multiple service providers and communication technologies as selected from the plurality of service providers and communication technologies;
wherein generating the second machine learning model comprises generating a different machine learning model for each combination of service providers and communication technologies so selected from the plurality of service providers and communication technologies;
wherein generating the third machine learning model comprises training the third machine learning model based on data indicating combinations of at least two of the plurality of service providers and communication technologies for providing the communication service; and
wherein the third machine learning model is further configured to output the third value including an indication of the measure of suitability of the selected one of the at least two of the plurality of service providers and communication technologies at the location.

3. The method of claim 1, wherein the first machine learning model and the second machine learning model are trained based on preliminary indications of availability of the communication service at different locations as provided by the plurality of service providers and communication technologies.

4. The method of claim 1, wherein the third machine learning model is trained further based on records that indicate, for each one of the multiple locations,
a subset of the plurality of service providers and communication technologies providing communication service at the one of the multiple locations, and
at least one of the plurality of service providers and communication technologies actually selected to provide communication service at the one of the multiple locations.

5. The method of claim 1, wherein the plurality of service providers and communication technologies comprise at least one of cable communication, fiber optics, digital subscriber line (DSL), cellular communication, and satellite communication.

6. The method of claim 1, wherein the first machine learning model, the second machine learning model, and the third machine learning model include at least one of a random forest model, an XG boost tree, a logistic regression model, a deep neural network, and support vector machines (SVMs).

7. The method of claim 1, wherein the interface is an application programming interface.

8. The method of claim 1, wherein the first machine learning model and the second machine learning model are trained based on a different set of data than a data set used to train the third machine learning model.

9. The method of claim 1, wherein the second machine learning models is trained to provide, in response to the input, a score indicating a likelihood that the selected one of the plurality of service providers and communication technologies technology provides communication services at at least one of a particular uplink speed and a particular downlink speed at the location.

10. The method of claim 1, wherein the second machine learning models is further trained to provide, in response to the input, a score for each one of multiple different service levels representing at least one of a different uplink speed and a downlink speed,
wherein the score indicates a likelihood that the selected one of the plurality of service providers and communication technologies provides the at least one of the different uplink speed and the downlink speed at the location.

11. The method of claim 10, wherein
the score further indicates a likelihood that the selected one of the service providers and communication technologies provides the at least one of the different uplink speed and downlink speed in a predetermined range of uplink and downlink speeds defined for a service level at the location.

12. The method of claim 1, wherein
generating the first machine learning model includes
generating a first model for a first one of the plurality of service providers and communication technologies, and
generating a second model for a second one of the plurality of service providers.

13. The method of claim 12, wherein
the first model is trained using a first training set, and
the second model is trained using a second training set, the second training set being different from the first training set.

14. A system comprising:
at least one computer including processors; and
non-transitory computer-readable media storing instructions that are operable, when executed by the processors, to perform operations comprising:
from a user, receiving input including a location at which a communication service to be provided and a selected one of a plurality of service providers and communication technologies for providing the communication service;
generating a first machine learning model for the plurality of service providers and communication technologies,
wherein the first machine learning model is trained to output, based on the input, a first value that indicates a predicted likelihood of availability of the communication service from the selected one of the plurality of service providers and communication technologies at the location;
generating a second machine learning model for the plurality of service providers and communication technologies,
wherein the second machine learning model is trained to output, based on the input, a second value that indicates a predicted level of the communication service provided by the selected one of the plurality of service providers and communication technologies at the location;
generating a third machine learning model, the third machine learning model being trained based on data indicating specific ones of the plurality of service providers and communication technologies that different users have previously selected and not selected to use at multiple locations, wherein the third machine leaning model is configured to
receive the input, and
output a third value that indicates a measure of suitability of the selected one of the plurality of service providers and communication technologies for use at the location based on actual service provided to the different users; and
providing an interface configured to
receive the input from the user, and
provide information to the user indicating availability of the communication service at the location based on the first value, the second value, and the third value from the first machine learning model, the second machine learning model, and the third machine learning model, respectively,
wherein providing the information includes
determining whether the first value satisfies a first predetermined threshold representing a minimum likelihood of availability of the communication service at the location,
determining whether the second value satisfies a second predetermined threshold representing a minimum predicted level of the communication service at the location, and
determining whether the third value satisfies a third predetermined threshold representing suitability of the communication service at the location.

15. The system of claim 14,
wherein the input includes a selection of at least two of the plurality of service providers and communication technologies for the communication service;
wherein generating the first machine learning model comprises generating a different machine learning model for each combination of multiple of service providers and communication technologies;
wherein generating the second machine learning model comprises generating a different machine learning model for each combination of service providers and communication technologies so selected from the plurality of service providers and communication technologies;
wherein generating the third machine learning model comprises training the third machine learning model based on data indicating combinations of at least two of the plurality of service providers and communication technologies for providing the communication service; and
wherein the third machine learning model is further configured to output the third value including an indication of the measure of suitability of the selected one of the at least two of the plurality of service providers and communication technologies at the location.

16. The system of claim 14, wherein the first machine learning model and the second machine learning model are trained based on preliminary indications of availability of the communication service at different locations as provided by the plurality of service providers and communication technologies.

17. The system of claim 14, wherein the third machine learning model is trained further based on records that indicate, for each one of the multiple locations,
a subset of the plurality of service providers and communication technologies providing communication service at the one of the multiple locations, and
at least one of the plurality of service providers and communication technologies actually selected to provide communication service at the one of the multiple locations.

18. The system of claim 14, wherein the first machine learning model, the second machine learning model, and the third machine learning model include at least one of a random forest model, an XG boost tree, a logistic regression model, a deep neural network, and support vector machines (SVMs).

19. A non-transitory computer-readable media storing instructions that are operable, when executed by processors of at least one computer, to perform operations comprising:
from a user, receiving input including a location at which a communication service is to be provided and a selected one of a plurality of service providers and communication technologies for providing the communication service;
generating a first machine learning model for the plurality of service providers and communication technologies,
wherein the first machine learning model is trained to output, based on the input, a first value that indicates a predicted likelihood of availability of the communication service from the selected one of the plurality of service providers and communication technologies at the location;
generating a second machine learning model for the plurality of service providers and communication technologies,
wherein the second machine learning model is trained to output, based on the input, a second value that indicates a predicted level of the communication service provided by the selected one of the plurality of service providers and communication technologies at the location indicated;
generating a third machine learning model, the third machine learning model being trained based on data indicating specific ones of the plurality of service providers and communication technologies that different users have previously selected and not selected to use at multiple locations,
wherein the third machine leaning model is configured to
receive the input, and
output a third value that indicates a measure of suitability of the selected one of the plurality of service providers and communication technologies for use at the location based on actual service provided to the different users; and
providing an interface configured to
receive the input from the user, and
provide information to the user indicating availability of the communication service at the location based on the first value, the second value, and the third value from the first machine learning model, the second machine learning model, and the third machine learning model, respectively,
wherein providing the information includes
determining whether the first value satisfies a first predetermined threshold representing a minimum likelihood of availability of the communication service at the location,
determining whether the second value satisfies a second predetermined threshold representing a minimum predicted level of the communication service at the location, and determining whether the third value satisfies a third predetermined threshold representing suitability of the communication service at the location.

20. The non-transitory computer-readable media of claim 19,
wherein the input includes a selection of at least two of the plurality of service providers and communication technologies for the communication service;
wherein generating the first machine learning model comprises generating a different machine learning model for each combination service providers and communication technologies;
wherein generating the second machine learning model comprises generating a different machine learning model for each combination of service providers and communication technologies;
wherein generating the third machine learning model comprises training the third machine learning model based on data indicating combinations of at least two of the plurality of service providers and communication technologies for providing the communication service; and
wherein the third machine learning model is further configured to output the third value including an indication of the measure of suitability of the selected one of the at least two of the plurality of service providers and communication technologies at the location.

* * * * *

UNITED STATES PATENT AND TRADEMARK OFFICE
CERTIFICATE OF CORRECTION

PATENT NO. : 12,511,577 B2
APPLICATION NO. : 17/865492
DATED : December 30, 2025
INVENTOR(S) : Amit Arora and John Kenyon Page 1 of 1

It is certified that error appears in the above-identified patent and that said Letters Patent is hereby corrected as shown below:

In the Claims

In Claim 1, Column 20, Line 17, please delete "each of"

In Claim 1, Column 20, Line 18, please delete "multiple"

In Claim 9, Column 22, Line 1, please delete "technology"

In Claim 19, Column 24, Line 36, please delete "indicated"

Signed and Sealed this
Tenth Day of February, 2026

John A. Squires
*Director of the United States Patent and Trademark Office*